United States Patent
Veitch et al.

(10) Patent No.: US 7,203,621 B1
(45) Date of Patent: Apr. 10, 2007

(54) SYSTEM WORKLOAD CHARACTERIZATION

(75) Inventors: Alistair Veitch, Mountain View, CA (US); Eric Anderson, Palo Alto, CA (US); John Wilkes, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 964 days.

(21) Appl. No.: 10/164,534

(22) Filed: Jun. 6, 2002

(51) Int. Cl.
*G06F 15/00* (2006.01)

(52) U.S. Cl. .................... 702/182; 702/186; 714/47

(58) Field of Classification Search ........ 702/118–121, 702/182, 186, 187; 717/131; 709/223; 713/340; 714/47–48

See application file for complete search history.

(56) References Cited

U.S. PATENT DOCUMENTS

| | | | |
|---|---|---|---|
| 5,315,580 A | | 5/1994 | Phaal |
| 6,119,174 A | | 9/2000 | Borowsky et al. |
| 6,269,410 B1 | * | 7/2001 | Spasojevic ............... 710/5 |
| 6,366,931 B1 | | 4/2002 | Borowsky et al. |
| 2002/0116441 A1 | * | 8/2002 | Ding et al. ............ 709/105 |
| 2005/0086646 A1 | * | 4/2005 | Zahavi et al. ............ 717/131 |

OTHER PUBLICATIONS

Borow sky, et al., "Capacity Planning with Phased Workloads," Proc. WOSP'98, Oct. 12-16, 1998.

Borow sky, et al., "Using Attribute-Managed Storage to Acheive QoS," 5th Intl. Workshop on Qos, Jun. 1997.

Keeton, et al., "Characterizing I/O Intensive Workload Sequentiality on Modern Disk Arrays," pow erpoint presentation given at 4th Workshop on Computer Architecture Evaluation using Commercial Workloads, Jan. 21, 2001.

Keeton, et al., "I/O Charazertication of Commercial Workloads," pow erpoint presentation given at 3th Workshop on Computer Architecture Evaluation using Commercial Workloads, Jan. 9, 2000.

Merchant,et al., "Capacity Planning with Phased Workloads," pow erpoint presentation given at Proc. WOSP' 98, Oct. 1998.

Wilkes, "Traveling to Rome: QoS Specifications for Automated Storage System Management," Proceedings of the International Workshop on Quality of Service (IWQoS), Jun. 6-8, 2001.

* cited by examiner

*Primary Examiner*—Moustafa M. Meky

(57) ABSTRACT

A technique of workload characterization for a computer system. Records of activity in the system are generated and identified as corresponding to each of a plurality of selected time periods. The records of activity for each selected time period are processed to form a characterization of the activity within each corresponding time period. Further, whether little or no activity occurs during a time period can be indicated by a binary representation. Periods of simultaneous activity of processes can then be determined by applying simple logical operations to the binary representations. Resources of the system may be reallocated based on the characterizations of the activity.

36 Claims, 7 Drawing Sheets

| Timing 202 | Device ID 204 | Start Address 206 | Transfer Size 208 | Volume ID 210 | R/W Flag 212 | Process ID 214 |

Computed Stream Characterizations

| | Time Period$_1$ | Time Period$_2$ | Time Period$_3$ | ... | Time Period$_M$ |
|---|---|---|---|---|---|
| Stream$_1$ | Values$_{1,1}$ | Values$_{1,2}$ | Values$_{1,3}$ | ... | Values$_{1,M}$ |
| Stream$_2$ | Values$_{2,1}$ | Values$_{2,2}$ | Values$_{2,3}$ | ... | Values$_{2,M}$ |
| Stream$_3$ | Values$_{3,1}$ | Values$_{3,2}$ | Values$_{3,3}$ | ... | Values$_{3,M}$ |
| ... | ... | ... | ... | ... | ... |
| Stream$_N$ | Values$_{N,1}$ | Values$_{N,2}$ | Values$_{N,3}$ | ... | Values$_{N,M}$ |

ON/OFF Parameter

|  | Time Period$_1$ | Time Period$_2$ | Time Period$_3$ | . . . | Time Period$_M$ |
|---|---|---|---|---|---|
| Stream$_1$ | 0 | 0 | 1 | . . . | 0 |
| Stream$_2$ | 1 | 1 | 1 | . . . | 0 |
| Stream$_3$ | 0 | 1 | 0 | . . . | 1 |
| . . . | . . . | . . . | . . . | . . . | . . . |
| Stream$_N$ | 1 | 0 | 0 | . . . | 0 |

700

Simultaneous Activity (Time Period$_2$)

|  | Stream$_N$ | Stream$_3$ | Stream$_2$ | Stream$_1$ |
|---|---|---|---|---|
| Stream$_1$ | 0 | 0 | 0 | |
| Stream$_2$ | 1 | 1 | | |
| Stream$_3$ | 0 | | | |
| Stream$_N$ | | | | |

Fig. 7

SYSTEM WORKLOAD CHARACTERIZATION

FIELD OF THE INVENTION

The present invention relates to computer systems. More particularly, the present invention relates to the field of workload characterization for computer systems.

BACKGROUND OF THE INVENTION

Due to such factors as advances in technology, reductions in computer hardware costs and growth of the World Wide Web, increasing quantities of digital data are being generated worldwide. For example, computer systems in homes, businesses and government are used to generate data in the form of text and other documents, databases, multi-media files, e-mail correspondence, web pages, and so forth. As a result, demands on computer systems in general, and particularly on data storage systems, are enormous and are growing over time.

Computer systems intended to handle modern demands can be difficult to configure and manage. For example, for a modern data storage system, a system designer must select from a vast array of available hardware devices and make numerous configuration choices. The designer must also specify how the data is to be distributed over the various devices of the data storage system. Among the challenges are complex behavior exhibited by many applications, ever-changing demands placed on the data storage system and the obsolescence and replacement of elements of the storage system.

Analysis of application behavior through workload characterization can be used to help ensure that the computer system is able to satisfy demands placed on it by the applications it serves. For example, the resources of a storage system, such as throughput and storage capacity, can be allocated so as to minimize throughput bottlenecks and to ensure that sufficient capacity is available to the applications.

Conventional workload characterization for storage systems involves collecting detailed records of I/O activity for the storage system. Typically, a record is generated for each I/O request. Data from the records is then statistically averaged so as to form a manageable workload characterization of the I/O activity. The workload characterization may then be used to configure and manage the storage system. For example, the workload characterization may be used to determine the utilization of elements of the storage system. The storage system may then be modified to improve its performance for the workload.

A drawback to conventional workload characterization for storage systems is that significant resources are typically required to collect and to compute statistical averages of the I/O activity. Further, important information regarding the I/O activity can be lost in the process of distilling the request records to a manageable workload characterization.

Accordingly, what is needed is an improved technique for system workload characterization.

SUMMARY OF THE INVENTION

The present invention is a technique for computer system workload characterization. The invention provides for improved workload characterization by minimizing loss of information related to activity and by minimizing computations required to compute the workload characterization.

In one aspect, activity records are divided according to time periods in which they occur and summaries of activity are computed only for activity that occurs within selected time periods. By selecting time periods of relatively short duration, different phases of activity can be identified and better characterized in comparison to prior techniques. Further, a binary representation can be used to indicate whether activity occurs during a time period. Time periods during which simultaneous activity occurs can be identified by applying simple logical operations to the binary representations.

Resources of the system can be reallocated for better utilization based on this characterization of the activity patterns. Thus, the present invention can be used to improve performance of the system for the workload, such as to increase data throughput of a data storage system and/or reduce response time. The present invention can also be used during design of a new system or during replacement of an existing system.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 7 illustrates a table of simultaneous I/O activity among streams during a selected time period in accordance with the present invention.

DETAILED DESCRIPTION OF A PREFERRED EMBODIMENT

The invention may be embodied in a computer system and a machine that characterizes activity of the system. In one aspect, the computer system is an enterprise system that includes a data storage system, in which case, I/O activity of the storage system is characterized. Resources of the system can be reallocated for better utilization based on this characterization of the activity. Thus, the present invention can be used to improve system quality, such as by increasing data throughput of a data storage system and/or reducing response time. The present invention can be used during design of a new system, during replacement of an existing system or during modification of an existing system.

While the figures and discussion herein are directed primarily to aspects of the invention in which I/O activity for a data storage system is characterized, it will be understood that activity of any type that occurs within a computer system, including but not limited to I/O activity, processor activity and network activity.

Figure 1:
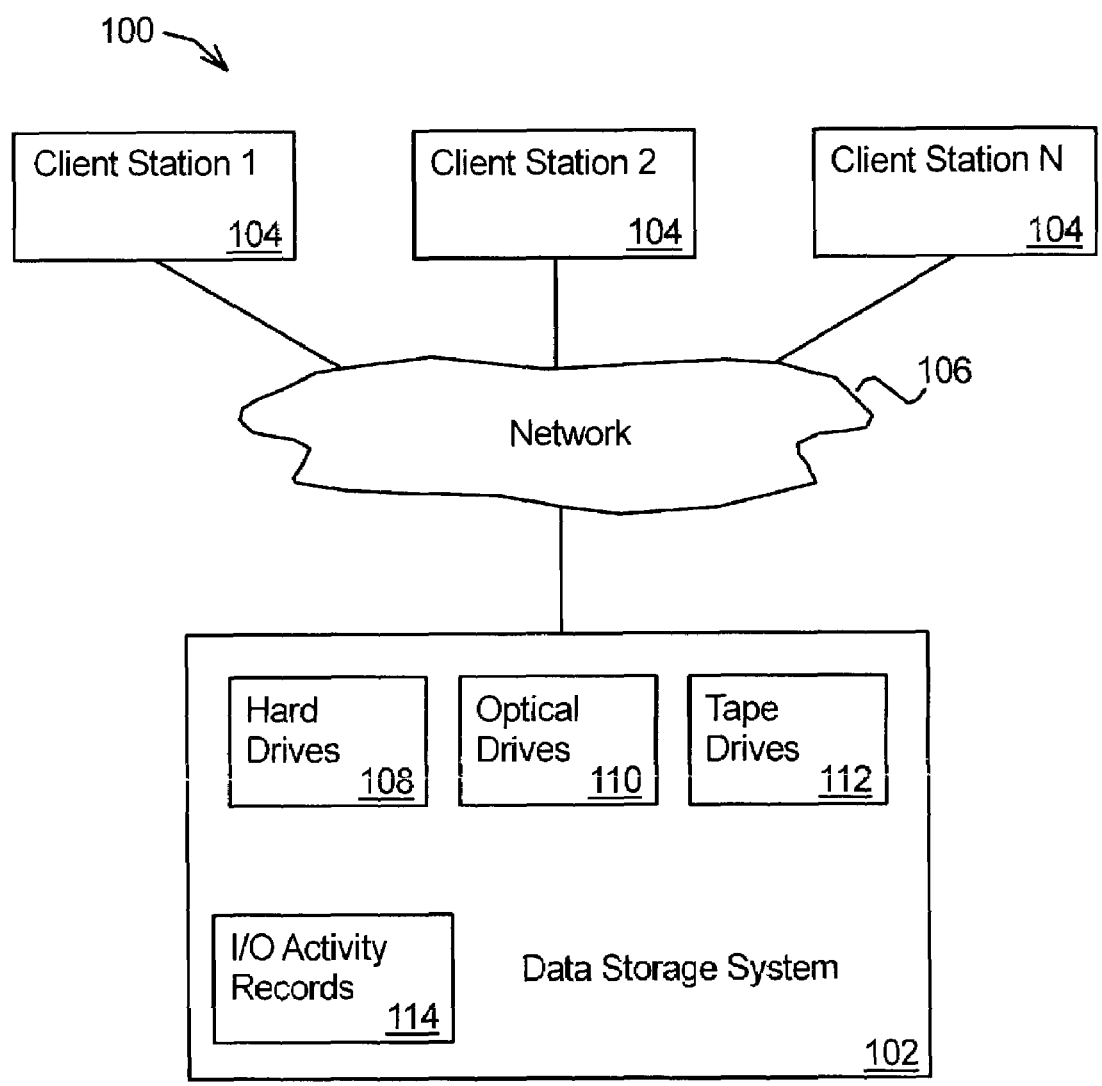
FIG. 1 illustrates a block diagram of an enterprise system in which the present invention may be embodied.

FIG. 1 illustrates an enterprise system 100 including a data storage system 102 and one or more client stations 104. The client stations 104 may each be implemented as a general-purpose computer system, workstation or terminal. The client stations 104 may communicate with the data storage system 102 via a network 106, such as fiber channel network or an Ethernet local area network (LAN). The client stations 104 act as clients of the data storage system 102. However, any of the client stations 104 may function as a server, in which case, such a client station 104 may have its own clients.

The data storage system 102 may include a plurality of storage devices. For example, the data storage system may include any number and types of drives, such as hard drives (also referred to as disk drives) 108, optical drives 110, and tape drives 112.

Each client station 104 may include an operating system and one or more applications. Exemplary applications include, but are not limited to, word-processing programs, database programs, e-mail programs, and backup programs. Certain application data may be stored at the client stations 104, and other application data (e.g., databases or backup files) might be stored on or across multiple of the data storage devices 108, 110, 112 in the data storage system 102.

Users of the enterprise system 100 communicate through the client stations 104. When a client station 104 performs an operation, it may send a request to the data storage system 102 to store information in the data storage system 102 or to retrieve information previously stored in the data storage system 102. In response to a request to store information, the data storage system 102 receives the information and a location within the data storage system 102 to store the information (e.g., a SCSI block address) or a name for a location (e.g., a filename or file handle plus offset) from the client station 104 making the request and then stores the information. In response to a request to retrieve information, the data storage system 102 receives the location, or the name for the location, of the requested information in the data storage system 102 from the client station 104, retrieves the information and returns the requested information to the client station 104 making the request.

More than one client station 104 may be executing an application at a given time. And, more than one client station 104 may be accessing or storing application data in the data storage system 102 at a given time.

A "store" refers to a unit of data storage. For example, a store may be a logical unit of data, such as a file, a logical volume, a database table or a portion thereof. The store may reside on a single device or may be distributed (e.g., striped) over a plurality of devices. A "stream" refers to I/O activity directed to a store. For example, a stream may include requests flowing between a client station 104 and a store. Each stream is generally directed to one store, though multiple streams may be directed to each store. The total collection of streams corresponding to a store is referred to as the "workload" of the store.

I/O activity in the system 100 may be monitored and recorded by one or more trace facilities. For this purpose, each client station 104 may run an operating system kernel (e.g., a UNIX kernel) which controls a flow of data between the client stations 104 and the data storage system 102 and collects traces. A "trace" is a collection of activity records, such as network packets, disk I/O requests or file system requests. Other operating systems are also known to generate system traces or equivalents thereof. A trace facility instructs each client station 104 to gather the traces. Therefore, one or more client stations 104 might be gathering traces at a given time. Traces may also be gathered by infrastructure of the network 106 (e.g., by one or more switches or routers) or by the data storage system 102 itself (e.g., by one or more disk arrays). The traces may be stored at the client stations 104, in the data storage system 102 or in some other manner.

Figure 2:
FIG. 2 illustrates a system trace record.

FIG. 2 illustrates an exemplary I/O request record 200. Each record 200 includes a plurality of fields 202-214 that contain information about an I/O request. The fields 202–214 may include:

1) timing information (202) which may include an enqueue time (i.e. when the kernel first sees the request), a start time (i.e. when the request is sent to the storage device) and completion time (i.e. when the request returns from the storage device);
2) a physical device ID number (204);
3) a start address (206);
4) a transfer size (208);
5) a logical volume ID number (210);
6) a read/write flags (212); and
7) a process ID number (214).

The trace record information shown in FIG. 2 and listed above is not intended to be limiting. For example, this information generally relates to block-level traces for a storage system, however, different information about any aspect of the storage system 102 may be present in a trace record. For example, a trace record may include queue depth, thread identification, logical volume offset, and/or any of the information shown in FIG. 2. As another example, various other timing information may be collected, such as timing information relating to various operations within the client stations 104, the network 106 or the storage system 102. Further, other types of trace records may be collected for a storage system, such as file-system traces. In addition, traces may be collected for other types of systems. For example, traces may be collected that relate to activity of a central processing unit of a computer system or that relate to network communication activity.

An important aspect of the present invention is that workload characterizations are developed only for selected time periods. Because I/O activity within a particular stream for a storage system can change over time, these changes can be better reflected in I/O characterizations that cover only limited time periods. This is because a particular stream may have several "phases" or time periods in which the I/O activity differs in nature. For example, during the normal business hours of an enterprise, a stream may consist mainly of requests that have low sequentiality and are divided approximately evenly between read and write operations. However, during after-hours, data protection operations may be performed for purposes of backing-up the data that was changed or created during the workday. Corresponding requests may consist largely of sequential read operations. Accordingly, the I/O characterization for the stream may change substantially between these two phases. In general, activity for a computer system can change over time and, thus, developing a workload characterization for selected time periods better reflects changes in the workload for the computer system.

Figure 3:
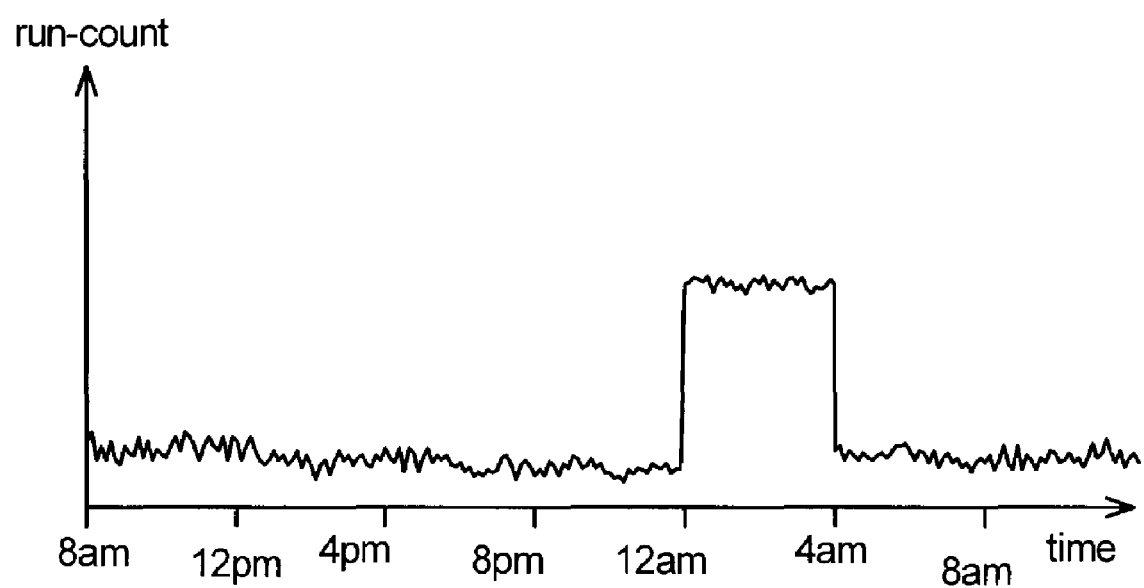
FIG. 3 illustrates a timing diagram in which a workload parameter (e.g., run-count) is assigned to the vertical axis and time is shown increasing along the horizontal axis.

FIG. 3 illustrates a timing diagram in which a workload characterization parameter is assigned to the vertical axis and time is shown increasing along the horizontal axis. In this example, run-count (i.e. the number of consecutive requests which access sequential storage locations) is assigned to the vertical axis. Elapsed time is shown by hours of the day, starting at 8 am, the beginning of a typical work day, and ending at approximately 8 am the following day, thus covering a twenty-four time period. As can be seen from the diagram, run-counts tend to be relatively constant during the workday and evening hours, (i.e. from 8 am to approximately 12 am). This corresponds to clients and servers routinely accessing data as they run various applications.

However, starting at 12 am and extending to approximately 4 am, backup processes may begin to perform various backup operations. Backup operations tend to affect larger blocks of sequential data than do data storage accessed by typical applications. Thus, as shown in the diagram, run-count increases dramatically during this period and then at approximately 4 am, run-count drops to a level typical for day and evening hours.

As used herein, a "phase" is a time period during which the I/O characterization differs from that of another time period. Thus, the run-count parameter in FIG. 3 has two distinct phases: a first phase during daytime and evening hours (4 am to 12 am); and a second phase during nighttime hours (12 am to 4 am). If all of the run-count data were to be collected and averaged for an extended period, as in conventional workload characterization techniques, the computed parameter would be higher than the normal daytime value and lower then the nighttime value. Accordingly, this value would not reflect the workload phases and would not be particularly representative of the actual run-counts at any time. While the example of FIG. 3 represents phases which occur during a 24 hour period, this is not intended to be limiting. Rather, other phases of activity may occur having other periods. For example, phases of activity may be seasonal, such as activity relating to shopping volume at an Internet website during a Holiday season. As another example, phases of activity may be monthly, such as activity to related to reconciling financial accounts at the end of each month. Further, phases can overlap each other. For example, seasonal activity may coincide with monthly activity. Also, rather than being periodic, phases may reflect activity that occurs at random intervals or at one-time only.

Rather, in accordance with the present invention, time periods are selected for sampling the I/O activity. In a preferred embodiment, the time periods are uniform in duration and discrete (i.e. non-overlapping). In addition, the time periods may be contiguous, but are preferably separated in time. Accordingly, the duration of the time period for collecting I/O records is preferably selected as well as a uniform interval between start of the collection periods. In another aspect, the interval between periods and/or the duration of periods may be randomly selected or pseudo-randomly selected. If variable, the intervals and/or durations may or may not be constrained within certain limits (e.g., intervals of between one and ten minutes).

To help identify different phases of I/O activity, the duration of the sampling time periods is preferably selected such that multiple sampling time periods can occur within each phase of I/O activity. Thus, for example, I/O records may be collected for a 30 second time period, with a new 30 second time period starting every five minutes. The intervening records (i.e. those that occur between the selected intervals) may be ignored or discarded. Accordingly, processing and storage requirements may be significantly reduced by avoiding having to process the intervening records.

In a further aspect, the durations of the periods or the intervals may be adaptively controlled. For example, a predetermined initial duration and interval may be used for collecting trace records. Then, if the workload characterization indicates that phases are significantly longer than the interval, then the interval and/or duration may be lengthened. Conversely, if phases are not identified (e.g., because they are shorter than the sampling period or interval), then the interval and/or duration may be shortened.

Alternately, the durations and/or intervals may be varied in a predetermined manner. For example, an initial duration may be used along with an initial interval. Then, once a number of trace records have been collected, one or both of the duration and interval may be increased or decreased according to a predetermined sequence. For example, an initial configuration may call for sampling periods of five seconds in duration and an interval of five minutes. The duration may then be increased in increments of five seconds until the duration reaches 2.5 minutes, for example. Then, the interval may be decreased to four minutes, for example, and process repeated until the duration reaches two minutes and so forth. Having trace records collected using a number of different sampling period durations and intervals may be expected to increase the ability to identify different phases which may, themselves, have different durations and overlap.

In one aspect, any known change point detection algorithm may be used to identify different phases of workload activity and to adjust the sampling period durations and intervals.

Figure 4:
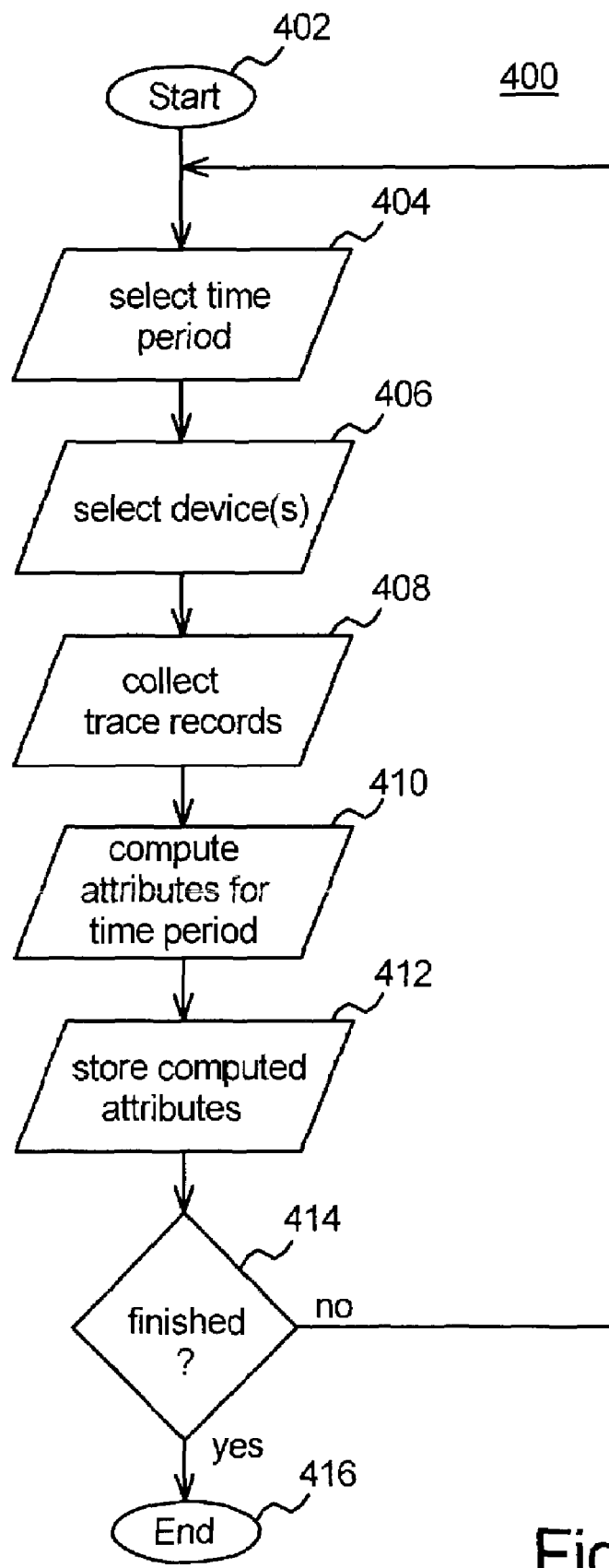
FIG. 4 illustrates a flowchart of a method for characterizing access patterns of I/O activity occurring during selected time periods, the method being performed in accordance with the present invention.

FIG. 4 illustrates a flow diagram 400 of a method in accordance with the present invention for characterizing the I/O activity occurring in a data storage system. Program flow begins in a start state 402. Then, in a step 404, a time period for collecting records may be selected or otherwise specified, as previously described. As explained above, this may include specifying a uniform duration for collection periods and a uniform interval between periods. Alternately, a varying duration and/or interval may be selected (e.g., that vary pseudo-randomly, adaptively or according to a predetermined sequence). In a step 406, one or more devices may be selected for which trace records are to be collected. This may include selecting a single device, multiple devices, or more typically, all devices, of the storage system 102. Then, in step 408, when a time period selected in step 404 occurs, the trace records may be collected for the devices selected in step 406.

Gathering I/O records for an enterprise application may frequently result in a trace that is significant in size (e.g., a few gigabytes or more). So as not to affect system behavior, the traces may optionally be stored on a data storage device 114 (FIG. 1) that does not house any of the application data. The device 114 may, for example, be included in the hard drives 108. As explained in more detail herein, processing of the traces into workload characterizations may then be performed by a computer system (e.g., a client station 104) that can access the system traces stored on the storage device 114.

Also in step 408, the records may be grouped according to streams and/or stores by examining the records. These groupings may be accomplished, for example, by sorting the I/O records according to physical device ID 204, logical volume 210, process ID 214 or a combination thereof.

Then, in a step 410 various workload parameters (also referred to as "attributes") may be computed from the records to form an I/O characterization for the selected time period. This may include, for example, computing a request rate parameter, a request size parameter, a run-count parameter and a queue size parameter. Each parameter may be represented as a statistical measure. For example, the statistical measure may include any of a mean value and variance, a median and a Semi-Inter-Quartile Range (SIQR), a histogram or other statistical measure The request rate parameter is indicative of the number of requests received per unit of time (e.g., per second) during the selected time slice and may be represented as a statistical measure. The request size parameter is indicative of the size of requests (i.e. the quantity of data) which occur during the selected time slice and may be represented as a statistical measure. The run-count parameter (i.e. the number of consecutive requests which affect sequential storage locations) is indicative of the sequentiality of requests which occur during the selected time slice and may be represented as a statistical measure. The queue size parameter is indicative of the number of outstanding requests not yet processed and may be represented as a statistical measure.

In one aspect, the attributes may include on times and off times that occur for a stream within the selected sampling time periods. The on times for a stream are a periods within a sampling period in which I/O activity occurs for a stream. Conversely, the off times are a periods within a sampling period in which I/O activity does not occur. For example, on times may be identified by time stamps associated each I/O request. If no request occurs for a predetermined period of time, e.g., 5 or 10 seconds, then this indicates the beginning of an off time.

An overlap fraction may be computed among streams within a selected time period based on the on times and off times. The overlap fraction indicates the degree of simultaneous activity between pairs of streams and is computed by measuring the overlap in I/O activity between the pair of streams. Such a technique is described in more detail in U.S. Pat. No. 6,269,410, entitled, "Method and Apparatus for Using System Traces to Characterize Workloads in a Data Storage System," the contents of which are hereby incorporated by reference. However, in accordance with an aspect of the present invention, the overlap fraction is computed only for simultaneous activity within a sampling time period. Thus, for any pair of streams, there may be as many overlap fractions computed as there are sampling time periods, one overlap fraction for each sampling time period. An overlap fraction may be computed for every possible combination of pairs of streams during each sampling time period. For sampling time periods that do not overlap, the overlap fraction is zero.

Further, one or more of the parameters may include separate values for both read and write operations that occur within the corresponding time period. For example, for request rate, a statistical measure for write requests may be computed and a statistical measure for read requests may be computed.

In a step 412, the parameters computed in the step 410 may be stored (e.g., in the device 114). These stored parameters may then be available for use to better conform the data storage system 102 to the workload.

In a step 414, a determination may be made as to whether computing the I/O characterizations is complete. For example, all of the collected records may have been processed. If not yet complete, program flow may return to the step 404 in which a next time period may be selected. The process of computing and storing parameters is then repeated for I/O records in the next time period. Once computing the I/O characterizations is complete, program flow may terminate in a step 416. This process of collecting trace records may last for a period of time such as a day, a week, a month, a year or multiple years. In general, trace records should be collected for at least as long as the longest phase of activity or for periodic phases, for at least as long as the period of the phases.

Thus, the trace records may be continuously collected as they are received. Records that fall within a current sampling time period may be collected until the end of the period, upon which the I/O characterizations may be computed for those records. Records that occur after a selected time period may be ignored until the next selected time period begins and collection resumes. In this scheme, the computations may be performed during the periods between collection periods. This simplifies the collection and computation activities since they can be interleaved and need not be performed simultaneously.

It should be noted, however, that steps of the method need not be performed in the order shown in FIG. 4. For example, the time period selection (step 404) may occur after collection of trace records (step 408). Also, grouping the trace records may be performed during the step 410, as part of an analysis of the trace records and computation of characterizations, rather than as a separate step (step 408). By combining the grouping of trace records with their analysis, trace buffering requirements may be reduced.

Figure 5:
FIG. 5 illustrates a table of computed stream characterizations formed in accordance with the present invention.

Thus, a technique has been described in which characterizations of I/O activity in a storage system are formed for each stream and for each of a plurality of time slices within the stream. FIG. 5 illustrates a table 500 of computed stream characterizations formed in accordance with the present invention. As can be seen, records for each of a number of streams 1-N, are separated into a number of time intervals or periods 1-M. Accordingly, a set of I/O characterization attributes are computed for each stream and each time period. For Stream$_N$ and Time Period$_M$, the I/O characterization values are given as Values$_{N,M}$. Each entry in the table 500 may, thus, be computed in step 412 (FIG. 4) and placed in the table in step 414 (FIG. 4). The table 500 may reside as a data structure in the device 114 (FIG. 1), at one of the client stations 104 or some other location.

Once the workload characterizations have been computed from the trace records, the trace records may be retained for some period or may be immediately discarded (e.g., they may be overwritten by other data). Similarly, after they are no longer useful, computed attributes may also be discarded. For example, the records of computed attributes and/or trace records may be discarded once they have reached a predetermined age, or based on the amount of activity which is reflected in the records, or based on their similarity to other records. For example, when a system (e.g., a storage system) is being designed for a particular workload, it may be desired that the system handles most of the workload, but is somewhat inadequate to handle the most intense periods of the workload. Since the intense periods may be rare, a worst-case design may not be cost effective. In those circumstances, it may be desirable to discard the records from periods which reflect the most intense workload activity and to design the system to handle the remaining periods.

As mentioned, trace records may be collected at different locations in the system 100. In a preferred embodiment, the time periods in which the trace records are collected are the same throughout the system 100. Accordingly, in a preferred embodiment, collection of the trace records is synchronized, such as by synchronized clocks. In the event trace collection is not synchronized, then records are preferably maintained that would enable comparison of the disjoint time periods. For example, assume that collection periods are thirty seconds in duration, and that at a first collection point the time period begins five second earlier than at a second collection point. Accordingly, the collection times can be divided into three distinct periods: a first period of five seconds in duration when only the first collection point is collecting, a second period of twenty-five second in duration in which both collection points are collecting and a third period in which only the second collection point is collecting. These periods may each be reflected in the table 500 by a separate column. Thus, a set of values may be computed for each stream and each of the three periods. Alternately, because traces collected during the overlapping collection period are likely to be most useful, only the second period (in which the collection periods overlap) may be recorded in the table 500, while the traces for the first and third periods (in which the collection periods do not overlap) may be discarded.

Figure 6:
FIG. 6 illustrates a table for a single workload parameter (i.e. active/inactive) in accordance with the present invention.

For some time slices, it is possible that little or no activity will occur for a particular stream or store. Accordingly, a binary value may be used to represent whether significant I/O activity occurred during the corresponding time slice. FIG. 6 illustrates a table 600 for this workload parameter (i.e. active/inactive or, simply, "ON/OFF") in accordance with the present invention. As can be seen from FIG. 6, for each $Stream_N$ and $Time Period_M$, the table 600 includes a binary entry which indicates whether the stream was active or inactive during the corresponding time period. A predetermined threshold may be set at zero activity, in which case, if there are any requests during the corresponding time period, activity will be indicated. Alternately, the threshold may be set at a number of requests, in which case, one or more requests may occur without activity being indicated by the binary value.

Further, the present invention allows the binary on/off indicators for plural streams to be compared (e.g., by using the logical AND operator) to determine whether both streams are active during the same selected time slice. FIG. 7 illustrates a table 700 of simultaneous I/O activity among Streams (1–N) during a selected time period, i.e. $Time Period_2$. Values in the table 700 may be computed simply by performing a logical AND operation of pairs of values from table 600 (FIG. 6). For example, $Stream_1$ is indicated as inactive by a "0" in the column in table 600 for $Time Period_2$, while $Stream_2$ is indicated as active by logical "1" in the column for $Time Period_2$. A logical AND operation of these two values yields a result of "0", indicating that they are not both active. Accordingly, a logical "0" is present in table 700 at the intersection of the row for $Stream_1$ and the column for $Stream_2$.

Conversely, $Stream_2$ and $Stream_3$ are each indicated as being active by a logical "1" in table 600 during $Time Period_2$. A logical AND operation of these two values yields a logical "1". Accordingly, a logical "1" is present in the table 700 at the intersection of the row for $Stream_2$ and the column for $Stream_3$.

Indications of simultaneous activity, such as those of table 700 or the overlap fractions may be computed and stored (e.g., in device 114) or individual values may be computed only as needed from the attributes. For example, the values from the table 700 may be computed as needed from the values of table 600. Rather than storing such attributes in the form of a table, e.g., table 700, the indications of simultaneous activity may be stored in association with other attributes for each stream. Thus, each row of entries in the table 700 may be separated from the other rows and stored with the other attributes, such as those of table 500 (FIG. 5). Also, rather than a two-dimensional table, as shown in FIG. 7, any number of dimensions may be used to represent whether any number or combination of streams are simultaneously active. For example, a three dimensional table may be used to indicate which combinations of three streams are simultaneously active. In addition, overlap information may be sparse (e.g., if the majority of entries in the table 700 would be empty), in which case, a different data structure may be used, such as a hash table or linked list.

Thus, an aspect of the present invention provides for representing periods of activity of a stream or store using a binary representation and for representing periods of simultaneous activity of two or more streams or stores by combining the binary representations for those streams or stores. This contrasts with techniques in which an overlap fraction is computed by determining on times and off times for streams and then, based on the on times and off times, determining a fraction of time during which the streams are simultaneously active. It will be apparent that techniques of the present invention (e.g., representing periods of activity using a binary representation) may be used selectively in conjunction with overlap fractions.

As can be seen, the present invention provides for the recording and computing of simultaneous activity among streams. This is an advantageous feature for distributing data among the storage devices of the storage system 102 because it can be readily determined from the active/inactive binary values which streams are simultaneously active. Streams that are often active at the same time potentially compete for resources and, thus, are more likely to need to be assigned to different devices. Conversely, streams that are seldom active at the same time have less potential to conflict and, thus, may more easily be assigned to the same devices. The present invention readily provides this useful information. Using the active/inactive attributes and/or any of the other computed attributes, data can later be re-allocated across the data storage system.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A method of workload characterization for a computer system for which a machine generates records of activity for the computer system, the method comprising collecting records of activity occurring during each of a plurality of selected time periods, each of the time periods starting at intervals and the time periods and intervals selected such that each interval is longer than the corresponding time period and records of activity occurring between successive time periods are not collected, and processing the collected records of activity for each selected time period to form a characterization of the activity within each corresponding time period.

2. The method according to claim 1, further comprising reallocating resources of the computer system based on the characterizations of the activity.

3. The method according to claim 1, wherein durations of at least one of said selected time periods and intervals are varied while said records are being collected.

4. The method according to claim 3, wherein said durations are selected randomly.

5. The method according to claim 3, wherein said durations are adaptively selected based on previously collected records.

6. The method according to claim 3, wherein said durations are selected in accordance with a predetermined sequence.

7. The method according to claim 1, wherein the computer system comprises a data storage system and wherein the activity records are records of I/O activity for the storage system.

8. The method according to claim 7, further comprising sorting said records of I/O activity according to a plurality of streams and wherein each characterization is for I/O activity of a corresponding stream.

9. The method according to claim 8, each stream being directed to a corresponding store.

10. The method according to claim 8, wherein each characterization for a stream includes one or more on times and one or more off times for each selected time period.

11. The method according to claim 10, wherein an overlap fraction is determined for each of a plurality of the time periods based on the on times and off times that occur within the same selected time period for a pair of the streams.

12. The method according to claim 8, wherein each characterization includes an indication of whether an activity level exceeding a predetermined threshold of activity occurred during the corresponding time period.

13. The method according to claim 12, wherein said indication is a binary value.

14. The method according to claim 13, further comprising performing a logic operation on selected ones of said binary values corresponding to a selected one of the time periods wherein a result of said logic operation indicates simultaneous activity occurred during the selected time period.

15. The method according to claim 14, wherein said logic operation is performed on a pair of binary values.

16. The method according to claim 14, wherein said logic operation is performed on more than two binary values.

17. The method according to claim 8, wherein each characterization includes a plurality of values, each value being for a corresponding parameter and each value including a statistical measure for the corresponding parameter.

18. The method according to claim 17, further comprising forming a data structure of said values wherein said data structure comprises a table having a first dimension for each stream or store and a second dimension for each time period and each entry at an intersection of a row and column including the corresponding values.

19. The method according to claim 17, the parameters including one or more parameters selected from the group consisting of: a request rate parameter, a request size parameter, a run-count parameter and a queue size parameter.

20. The method according to claim 1, further comprising discarding portions of the characterization of the activity.

21. The method according to claim 20, said discarding being based on aging of the portions.

22. The method according to claim 20, said discarding being based on a level of activity reflected in the portions.

23. The method according to claim 12, said discarding being based on similarity of the portions.

24. The method according to claim 1, further comprising discarding records of the activity based on aging of the records.

25. The method according to claim 1, further comprising discarding records of the activity based on a level of activity reflected in the records.

26. The method according to claim 1, further comprising discarding records of the activity based on similarity of the records.

27. An article of manufacture for a computer having access to records of I/O activity for a data storage system, the article comprising machine-readable code for instructing the computer to collect records of I/O activity occurring during each of a plurality of selected time periods, each of the time periods starting at intervals and the time periods and intervals selected such that each interval is longer than the corresponding time period and records of activity occurring between successive time periods are not collected, and to process the records of I/O activity for each selected time period to form a characterization of the I/O activity within each corresponding time period.

28. The article according to claim 27, wherein durations of at least one of said selected time periods and intervals are varied while said records are being collected.

29. The method according to claim 28, wherein said durations are selected randomly.

30. The method according to claim 28, wherein said durations are adaptively selected based on previously collected records.

31. The method according to claim 28, wherein said durations are selected in accordance with a predetermined sequence.

32. The method according to claim 27, wherein each characterization includes a plurality of values, each value being for a corresponding parameter and wherein each value includes a statistical measure for the corresponding parameter.

33. A method of workload characterization for a computer system for which a machine generates records of activity for the computer system, the method comprising collecting records of activity occurring during each of a plurality of selected time periods, each of the time periods starting at intervals and durations of at least one of said selected time periods and intervals being varied while said records are being collected, and processing the collected records of activity for each selected time period to form a characterization of the activity within each corresponding time period.

34. The method according to claim 33, wherein said durations are selected randomly.

35. The method according to claim 33, wherein said durations are adaptively selected based on previously collected records.

36. The method according to claim 33, wherein said durations are selected in accordance with a predetermined sequence.

* * * * *

UNITED STATES PATENT AND TRADEMARK OFFICE
CERTIFICATE OF CORRECTION

PATENT NO. : 7,203,621 B1  Page 1 of 1
APPLICATION NO. : 10/164534
DATED : April 10, 2007
INVENTOR(S) : Alistair Veitch et al.

It is certified that error appears in the above-identified patent and that said Letters Patent is hereby corrected as shown below:

On the face page, in field (56), under "Other Publications", in column 2, line 4, delete "pow erpoint" and insert -- powerpoint --, therefor.

On the face page, in field (56), under "Other Publications", in column 2, line 8, delete "pow erpoint" and insert -- powerpoint --, therefor.

On the face page, in field (56), under "Other Publications", in column 2, lines 10-11, delete "pow erpoint" and insert -- powerpoint --, therefor.

In column 11, line 49, in Claim 23, delete "claim 12" and insert -- claim 20 --, therefor.

Signed and Sealed this

Fifth Day of May, 2009

JOHN DOLL
*Acting Director of the United States Patent and Trademark Office*